United States Patent
Shon et al.

(10) Patent No.: US 10,397,254 B2
(45) Date of Patent: Aug. 27, 2019

(54) METHOD AND SYSTEM OF MONITORING NETWORK

(71) Applicant: AJOU UNIVERSITY INDUSTRY-ACADEMIC COOPERATION FOUNDATION, Suwon-si, Gyeonggi-do (KR)

(72) Inventors: Tae Shik Shon, Suwon-si (KR); Yong Min Park, Suwon-si (KR); Hyung Uk Yoo, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 453 days.

(21) Appl. No.: 15/145,870

(22) Filed: May 4, 2016

(65) Prior Publication Data

US 2016/0337218 A1 Nov. 17, 2016

(30) Foreign Application Priority Data

May 12, 2015 (KR) .................. 10-2015-0065915

(51) Int. Cl.
- *H04L 29/06* (2006.01)
- *H04L 12/26* (2006.01)
- *H04L 29/14* (2006.01)

(52) U.S. Cl.
CPC ........ *H04L 63/1425* (2013.01); *H04L 43/062* (2013.01); *H04L 43/12* (2013.01); *H04L 69/08* (2013.01); *H04L 69/40* (2013.01)

(58) Field of Classification Search
CPC ....... H04L 43/062; H04L 43/12; H04L 69/40; H04L 63/1425; H04L 69/08
See application file for complete search history.

(56) References Cited

U.S. PATENT DOCUMENTS

| | | | |
|---|---|---|---|
| 2007/0008968 A1 | 1/2007 | Baker et al. | |
| 2008/0301813 A1* | 12/2008 | Neystadt ............. | G06F 11/3672 726/25 |
| 2011/0096762 A1* | 4/2011 | Basart ................. | H04L 12/6418 370/338 |
| 2013/0268801 A1 | 10/2013 | Yamato | |
| 2015/0032495 A1* | 1/2015 | Senarath .......... | G06Q 10/06313 705/7.23 |

FOREIGN PATENT DOCUMENTS

JP 2006-50433 A 2/2006

* cited by examiner

*Primary Examiner* — Mandish K Randhawa
(74) *Attorney, Agent, or Firm* — Sughrue Mion, PLLC

(57) ABSTRACT

Provided are a method of monitoring a network driving apparatus provided in a network and a system thereof.
The present invention provides a network monitoring method that performs monitoring which does not hinder existing network availability through a means for detouring a path of a packet transferred to a monitoring target apparatus by using one or more servers and clients connected to a network and further, provides extensibility which can be applied to the network using various communication protocols through a protocol converting means that detours the path of the packet after converting the existing protocol into a TCP/IP protocol.

17 Claims, 7 Drawing Sheets

[FIG. 1]
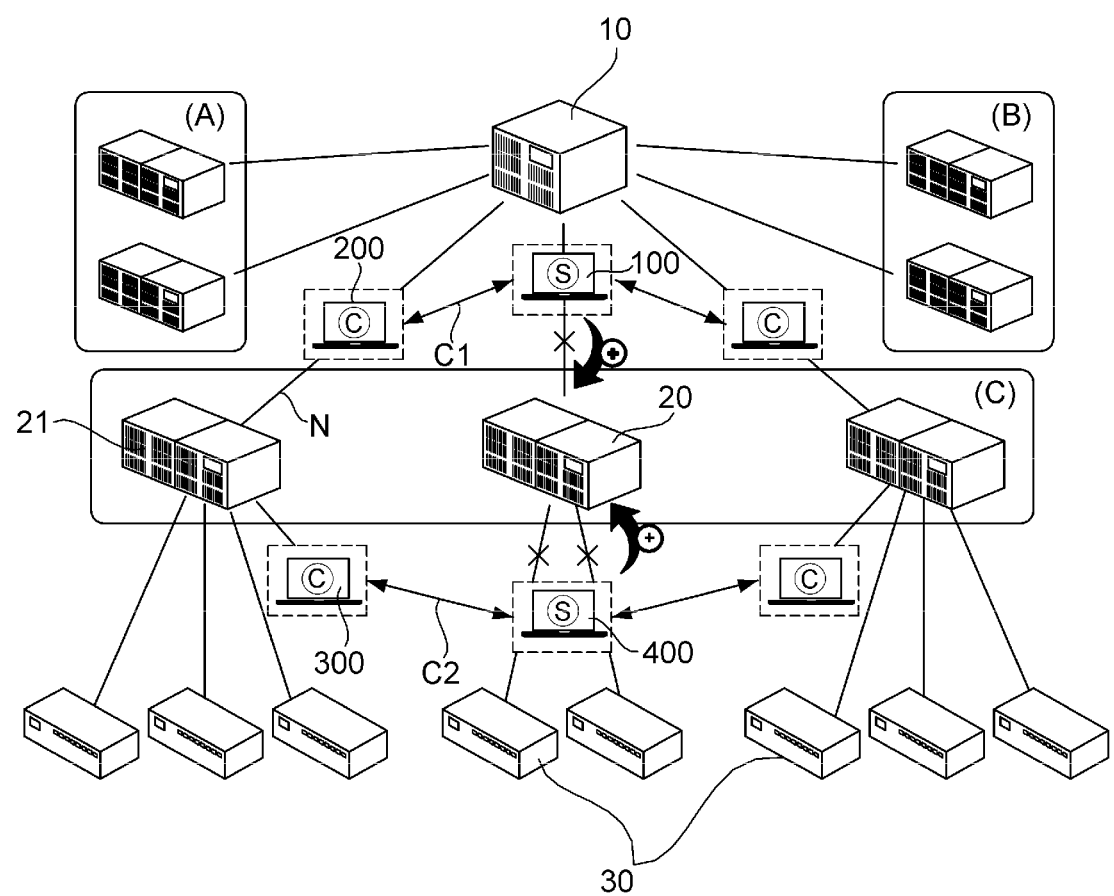

[FIG. 2]
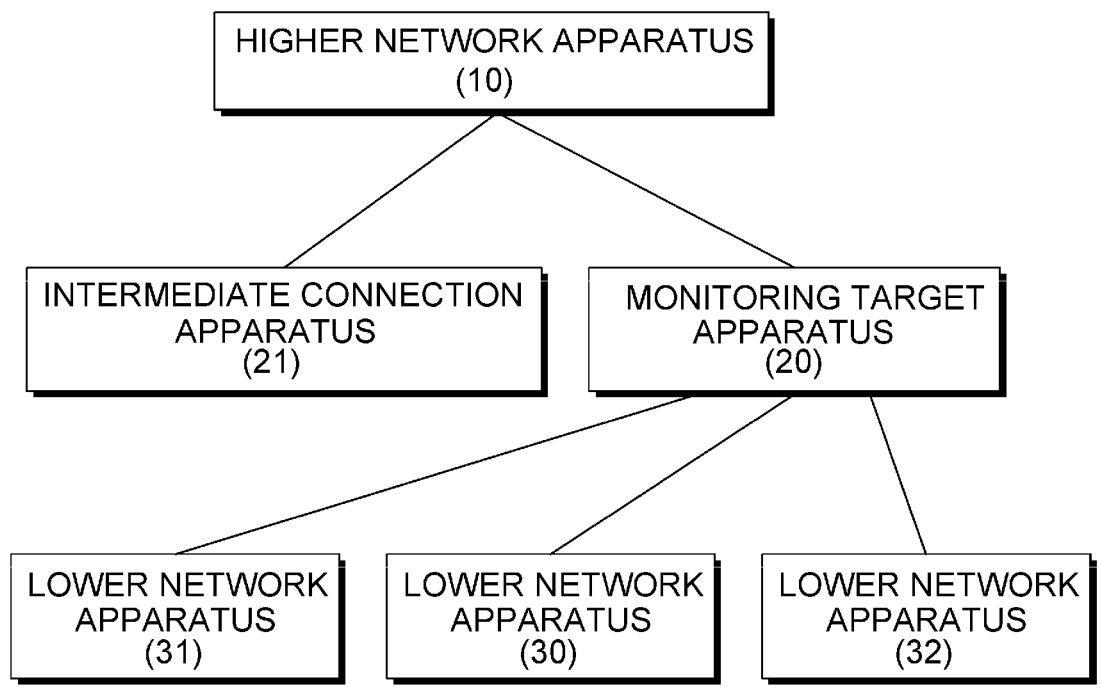

[FIG. 3]
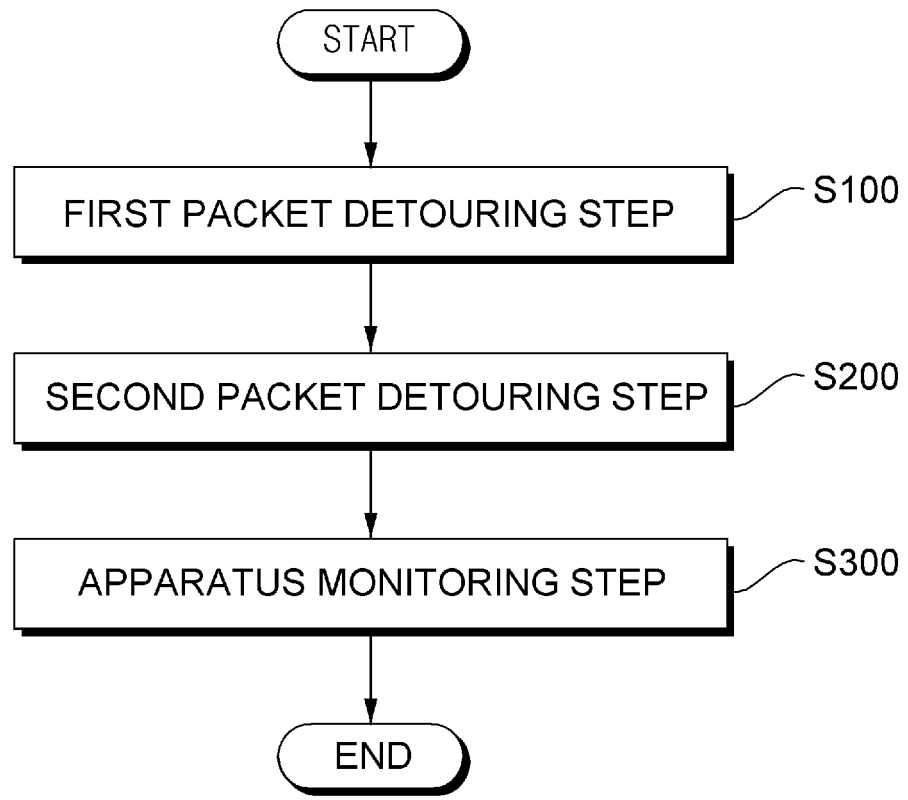

[FIG. 4]
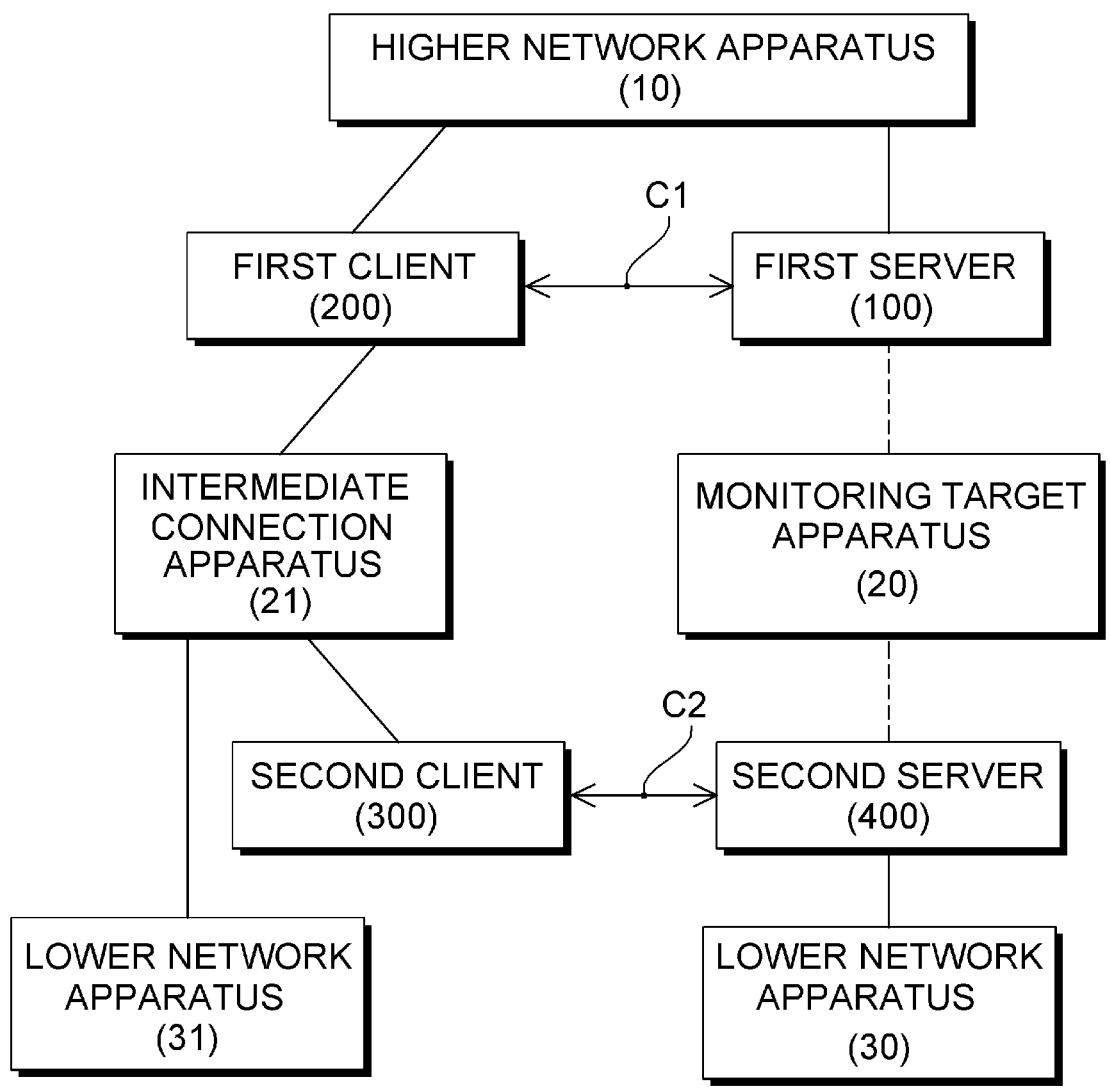

[FIG. 5]
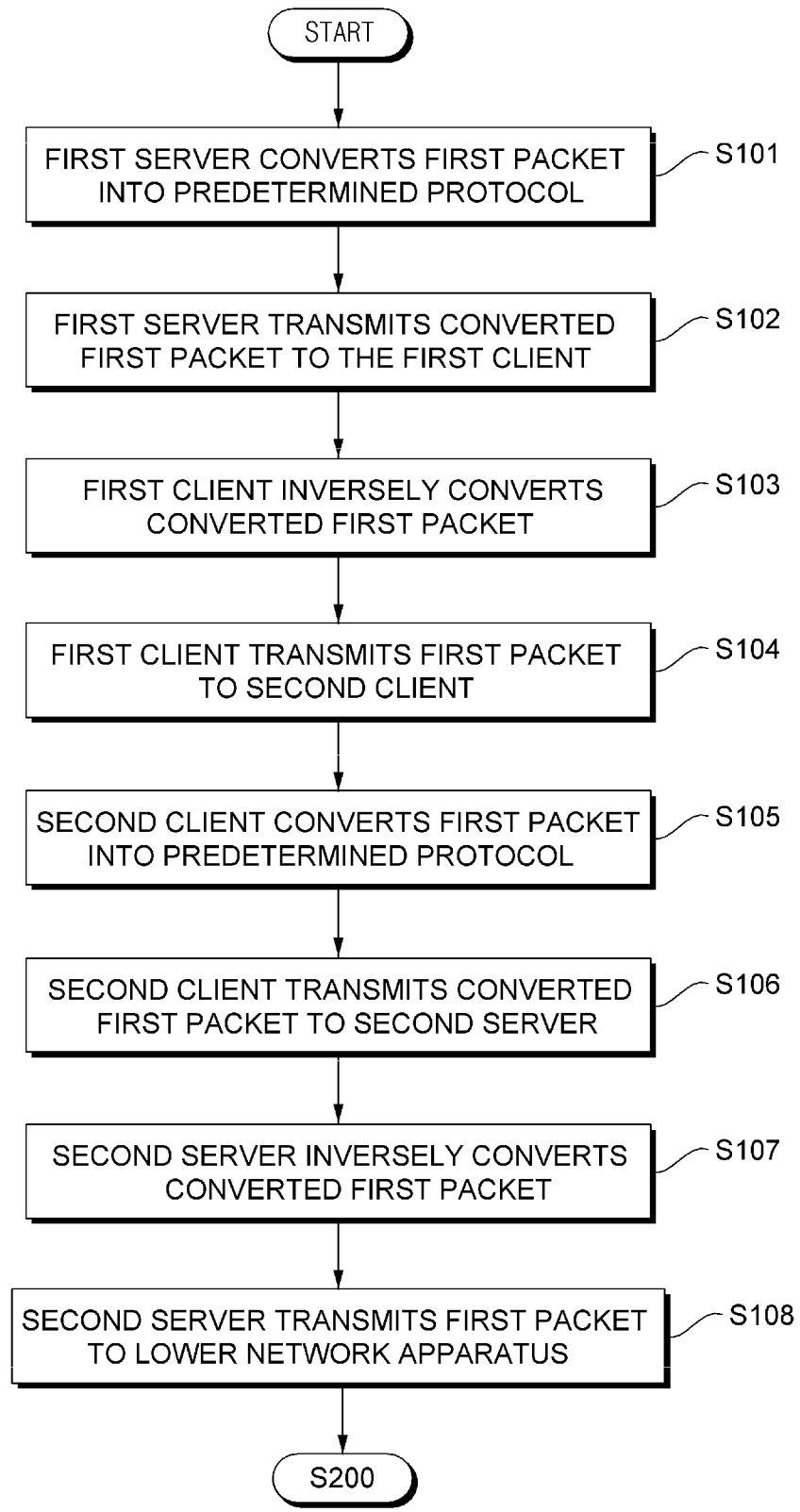

[FIG. 6]
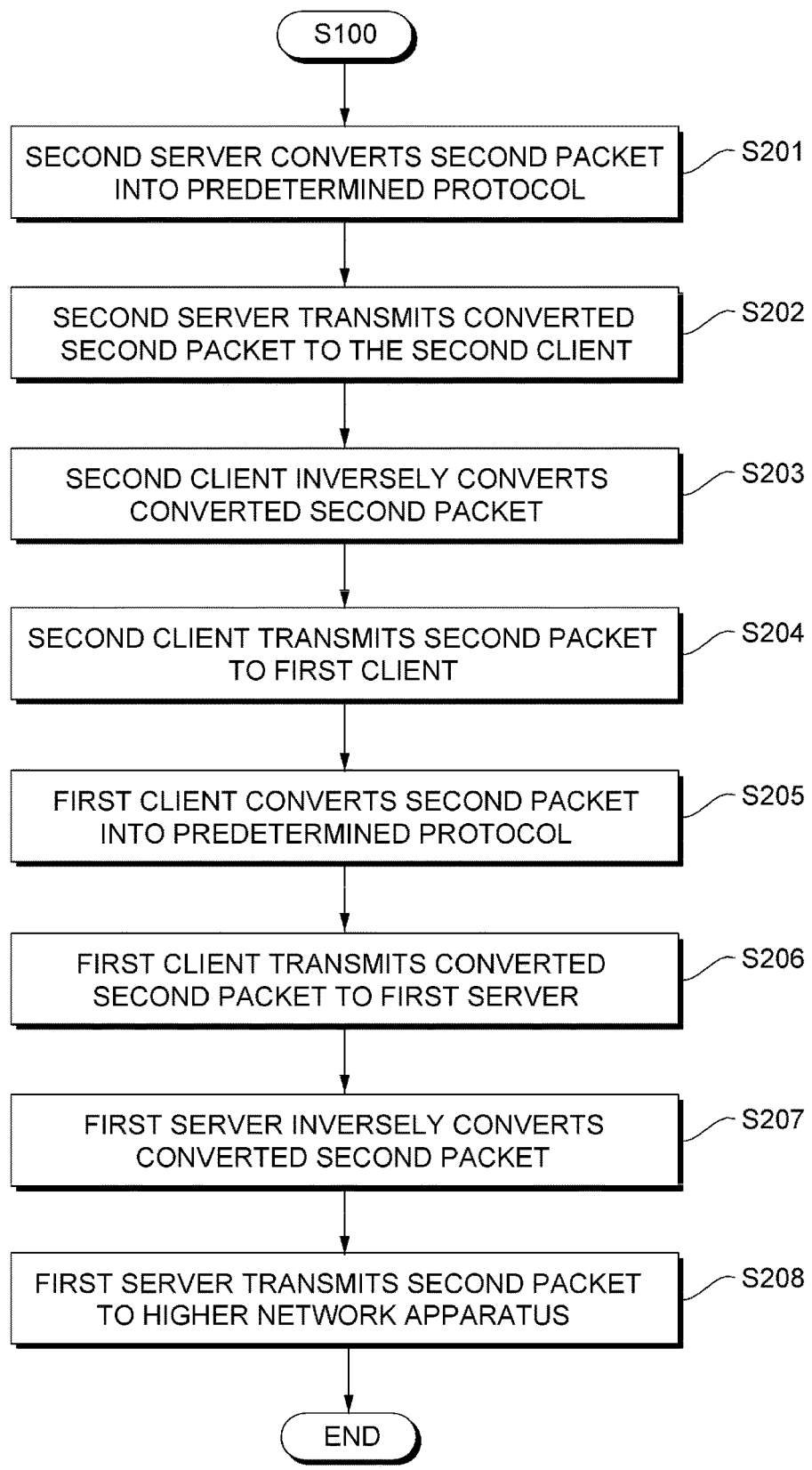

[FIG. 7]
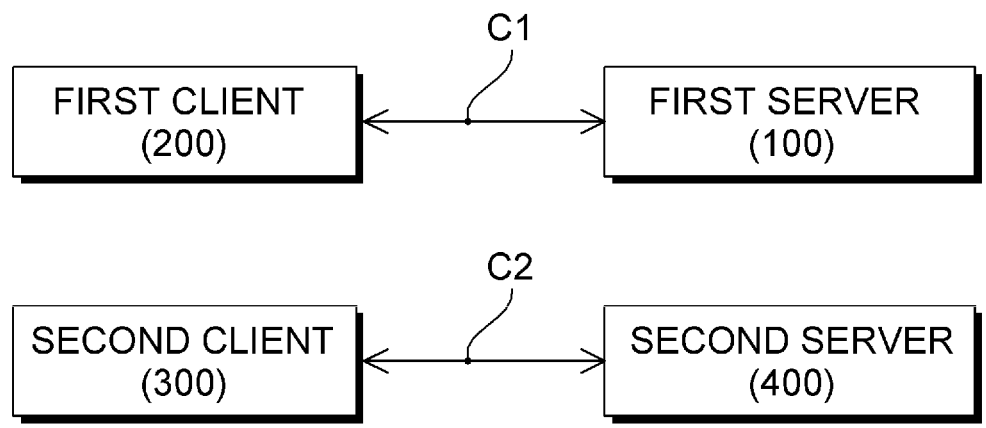

METHOD AND SYSTEM OF MONITORING NETWORK

CROSS-REFERENCE TO RELATED APPLICATIONS

This application claims priority to and the benefit of Korean Patent Application No. 10-2015-0065915 filed in the Korean Intellectual Property Office on May 12, 2015, the entire contents of which are incorporated herein by reference.

TECHNICAL FIELD

The present invention relates to a method of monitoring a network driving apparatus provided in a network and a system thereof.

In particular, the present invention relates to a method for controlling a packet flow of the network in order to monitor a specific network driving apparatus while similarly maintaining an operation of a whole network.

BACKGROUND ART

An intermediate connection apparatus such as a repeater or a router that supports a network connection of various terminals and a control center that supports the network connection of the intermediate connection apparatuses are required in order to operate a network. In this case, since the intermediate connection apparatus is connected with a plurality of terminals to manage and relay a packet which the terminals transmit and receive on the network and there is a limit in the number of terminals which each intermediate connection apparatus can support, terminals of a group, which is divided by a specific region or place are connected to the network through one or more intermediate connection apparatuses.

The control center is connected with the intermediate connection apparatus that belongs to each group to distribute network resources for each group and transmit and receive a data packet to and from the intermediate connection apparatus.

A specific intermediate connection apparatus needs to be monitored in order to test security or enhance or change a function of the network while operating a whole network. However, in order to monitor the specific intermediate connection apparatus, since the corresponding intermediate connection apparatus cannot perform a role performed on the existing network connection, there is a problem in that a partial network or a whole network of the group to which the corresponding intermediate connection apparatus belongs cannot be temporarily operated.

In particular, in a network in which a connection structure in which the control center reaches the terminal through the intermediate connection apparatus is vertical and the terminal is not connected with a plurality of intermediate connection apparatuses that performs the same role, there is a problem in that the network needs to temporarily stop in order to monitor the specific intermediate connection apparatus.

The problem occurs similarly even in a measurement network that collects and manages measurement data by the unit of each terminal or a specific group to which each terminal belongs through a plurality of measurement terminals. In the measurement network, each terminal may be, for example, a measurer that reads an electric usage or a water supply usage for a household and measurers in a predetermined region can be connected to the intermediate connection apparatus of the corresponding region through the network. Further, a local network is constituted by the plurality of intermediate connection apparatuses in order to collect and manage reading data from the measurers in the specific region and the control center is connected with one or more local networks to manage the reading data collected from the measurer connected to the intermediate connection apparatuses in each local network.

In the measurement network, there is a problem in that the local network to which the corresponding intermediate connection apparatus belongs cannot be temporarily operated in order to monitor the intermediate connection apparatus in a specific local network.

SUMMARY OF THE INVENTION

The present invention has been made in an effort to provide a network monitoring method that performs monitoring which does not hinder existing network availability through a means for detouring a path of a packet transferred to a monitoring target apparatus by using one or more servers and clients connected to a network and further, provides extensibility which can be applied to the network using various communication protocols through a protocol converting means that detours the path of the packet after converting the existing protocol into a TCP/IP protocol.

An exemplary embodiment of the present invention provides a method for monitoring a network, including: a first packet detouring process of, with respect to a first packet transmitted to a monitoring target apparatus from a higher network apparatus, converting, by a first server connected to the network, the first packet to a predetermined communication protocol and transmitting the first packet to a lower network apparatus by detouring a path on which the first packet is transmitted to the lower network apparatus through the monitoring target apparatus by using a separate first communication connection distinguished from the network; and a second packet detouring process of, with respect to a second packet transmitted to the monitoring target apparatus from the lower network apparatus, converting, by a second server connected to the network, the second packet to the predetermined communication protocol and transmitting the second packet to the higher network apparatus by detouring a path on which the second packet is transmitted to the higher network apparatus through the monitoring target apparatus by using a separate second communication connection distinguished from the network.

Herein, the method may further include an apparatus monitoring process in which a monitoring program monitors the monitoring target apparatus.

Herein, in the first communication connection and the second communication connection, communication may be performed by using the predetermined communication protocol, and the predetermined communication protocol may be a protocol different from the protocol used in the network.

Herein, the first communication connection may be a communication connection between the first server and a first client connected to the network, the second communication connection may be a communication connection between the second server and a second client connected to the network, and the first client and the second client may be connected to the higher network apparatus and connected to an intermediate connection apparatus positioned on the same layer as the monitoring target apparatus.

Herein, the predetermined communication protocol may be a TCP/IP protocol. Herein, the first packet detouring process may include converting, by the first server, the first packet transmitted from the higher network apparatus to the monitoring target apparatus into the predetermined communication protocol and transmitting the converted first packet to the first client through the first communication connection, inversely converting, by the first client, the converted first packet into the protocol used in the network to acquire the first packet and transmitting the acquired first packet to the second client through the network, converting, by the second client, the received first packet into the predetermined communication protocol and transmitting the converted first packet to the second server through the second communication connection, and inversely converting, by the second server, the received converted first packet to acquire the first packet and transmitting the acquired first packet to the lower network apparatus.

Herein, in the acquiring of the first packet and transmitting of the acquired first packet to the second client through the network, an identification number may be granted to the first packet and the first packet to which the identification number is granted may be transmitted to the second client.

Herein, the second packet detouring process may include converting, by the second server, the second packet transmitted from the lower network apparatus to the monitoring target apparatus into the predetermined communication protocol and transmitting the converted second packet to the second client through the second communication connection, inversely converting, by the second client, the converted second packet into the protocol used in the network to acquire the second packet and transmitting the acquired second packet to the first client through the network, converting, by the first client, the received second packet into the predetermined communication protocol and transmitting the converted second packet to the first server through the first communication connection, and inversely converting, by the first server, the received converted second packet to acquire the second packet and transmitting the acquired second packet to the higher network apparatus.

Herein, in the acquiring of the second packet and transmitting of the acquired second packet to the first client through the network, the identification number may be granted to the second packet and the second packet to which the identification number is granted may be transmitted to the first client.

Herein, as the identification number, a specific number may be granted to any one of surplus fields of which values are changeable without influencing communication among data fields of the packet depending on the protocol used in the network to grant the identification number.

Herein, in the apparatus monitoring process, a monitoring program may input various types of predetermined data in the monitoring target apparatus and verify output data depending on the input data to determine whether the monitoring target apparatus is abnormal.

Herein, the higher network apparatus may be a control center of the network, the lower network apparatus may be a terminal connected to the network, and the monitoring target apparatus may be an intermediate connection apparatus that supports a connection of the control center and the terminal.

Another exemplary embodiment of the present invention provides a computer program stored in a medium in order to execute the network monitoring method in connection with a server and a client.

Yet another exemplary embodiment of the present invention provides a system for monitoring a network, including: a first server converting a first packet transmitted from a higher network apparatus to a monitoring target apparatus into a predetermined communication protocol; a first client receiving the converted first packet from the first server by using a separate first communication connection distinguished from the network and inversely converting the received first packet into the protocol used in the network to acquire the first packet; a second client receiving the first packet from the first client through the network and converting the received first packet into the predetermined protocol; and a second server receiving the converted first packet from the second client by using a separate second communication connection distinguished from the network and inversely converting the received first packet into the protocol used in the network to acquire the first packet and transmitting the first packet to a lower network apparatus.

Herein, the first communication connection may be a communication connection between the first server and a first client connected to the network, the second communication connection may be a communication connection between the second server and a second client connected to the network, and the first client and the second client may be connected to the higher network apparatus and connected to an intermediate connection apparatus positioned on the same layer as the monitoring target apparatus.

Herein, the second server may convert the second packet transmitted from the lower network apparatus to the monitoring target apparatus into the predetermined communication protocol and transmit the converted second packet to the second client through the second communication connection.

Herein, the second client may inversely convert the converted second packet into the protocol used in the network to acquire the second packet and transmit the acquired second packet to the first client through the network, the first client may convert the received second packet into the predetermined communication protocol and transmit the converted second packet to the first server, and the first server may inversely convert the received converted second packet to acquire the second packet and transmit the acquired second packet to the higher network apparatus.

Herein, the network monitoring system may transmit the first packet from the higher network apparatus to the lower network apparatus by detouring a path on which the first packet is transmitted to the lower network apparatus through the monitoring target apparatus by using the first communication connection and transmit the second packet from the lower network apparatus to the higher network apparatus by detouring a path on which the second packet is transmitted to the higher network apparatus through the monitoring target apparatus by using the second communication connection.

Herein, in the first communication connection and the second communication connection, communication may be performed by using the predetermined communication protocol, and the predetermined communication protocol may be a protocol different from the protocol used in the network.

Herein, in the monitoring target apparatus, a monitoring program may input various types of predetermined data in the monitoring target apparatus and verify output data depending on the input data to determine whether the monitoring target apparatus is abnormal.

According to exemplary embodiments of the present invention, in a network monitoring method, monitoring that does not hinder existing network availability is performed through a means for detouring a path of a packet transferred to a monitoring target apparatus by using one or more servers and clients connected to a network.

Extensibility which can be applied to a network using various communication protocols is provided through a protocol converting means that detours the path of the packet after converting the existing protocol into a TCP/IP protocol.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a reference diagram illustrating a configuration of a network in which a network monitoring method operates according to the present invention.

FIG. 2 is a reference diagram illustrating a connection relationship of a monitoring target apparatus, a higher network apparatus, and a lower network apparatus.

FIG. 3 is a flowchart of a network monitoring method according to the present invention.

FIG. 4 is a reference diagram illustrating a method in which the network monitoring method detours a packet according to the present invention.

FIG. 5 is a flowchart illustrating a detailed operation of a first packet detouring step.

FIG. 6 is a flowchart illustrating a detailed operation of a second packet detouring step.

FIG. 7 is a block diagram illustrating a network monitoring system according to yet another exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. When reference numerals refer to components of each drawing, it is noted that although the same components are illustrated in different drawings, the same components are referred to by the same reference numerals as possible. Further, in the description of the present invention, the detailed descriptions of known related constitutions or functions thereof may be omitted if it is determined that they make the gist of the present invention unclear. In addition, hereinafter, the exemplary embodiments of the present invention will be described, but the technical spirit of the present invention is not limited or restricted thereto and the exemplary embodiments of the present invention can be modified and variously implemented by those skilled in the art.

A specific intermediate connection apparatus needs to be monitored in order to test security or enhance or change a function of the network during operating a whole network. However, in order to monitor the specific intermediate connection apparatus, since the corresponding intermediate connection apparatus cannot perform a role performed on the existing network connection, there is a problem in that a partial network or a whole network of the group to which the corresponding intermediate connection apparatus belongs cannot be temporarily operated.

In particular, in a network in which a connection structure in which the control center reaches the terminal through the intermediate connection apparatus is vertical and the terminal is not connected with a plurality of intermediate connection apparatuses that performs the same role, there is a problem in that the network needs to temporarily stop in order to monitor the specific intermediate connection apparatus.

The problem occurs similarly even in a measurement network that collects and manages measurement data by the unit of each terminal or a specific group to which each terminal belongs through a plurality of measurement terminals. In the measurement network, each terminal may be, for example, a measurer that reads an electric usage or a water supply usage for a household and measurers in a predetermined region can be connected to the intermediate connection apparatus of the corresponding region through the network. Further, a local network is constituted by the plurality of intermediate connection apparatuses in order to collect and manage reading data from the measurers in the specific region and the control center is connected with one or more local networks to manage the reading data collected from the measurer connected to the intermediate connection apparatuses in each local network.

In the measurement network, there is a problem in that the local network to which the corresponding intermediate connection apparatus belongs cannot be temporarily operated in order to monitor the intermediate connection apparatus in a specific local network.

The present invention discloses a method for monitoring a network and a system thereof, which can monitor a target apparatus so as to prevent the existing network availability from being hindered through a means for detouring a path of a packet transmitted to an intermediate connection apparatus to be monitored in monitoring the intermediate connection apparatus of the network including the existing measurement network.

FIG. 1 is a reference diagram illustrating a configuration of a network in which a network monitoring method operates according to the present invention.

As illustrated in FIG. 1, the network may include an intermediate connection apparatus connected to a plurality of terminals and a control center connecting a plurality of intermediate connection apparatuses. Further, sets of the intermediate connection apparatuses connecting terminals in predetermined groups such as A, B, and C of FIG. 1 may be divided.

In this case, security of the intermediate connection apparatuses included in the network is tested or a specific intermediate connection apparatus may be monitored for improving or changing the function thereof.

Hereinafter, the specific intermediate connection apparatus to be monitored is called a monitoring target apparatus 20 and an apparatus such as the control center connected with a higher network of the monitoring target apparatus 20 is called a higher network apparatus 10. Further, an apparatus such as the terminal connected to a lower network of the monitoring target apparatus 20 is called a lower network apparatus 30.

FIG. 2 is a reference diagram illustrating a connection relationship between the monitoring target apparatus 20, and the higher network apparatus 10 and the lower network apparatus 30 based on the monitoring target apparatus 20.

Herein, the higher network apparatus 10 and the lower network apparatus 30 are relative concepts based on the monitoring target apparatus 20, and an apparatus connected to the higher network of the monitoring target apparatus 20 in the network may be the higher network apparatus 10. The higher network apparatus 10 is connected with the intermediate connection apparatuses 21 on the same layer as the monitoring target apparatus 20, and the monitoring target apparatus 20 which is one of the intermediate connection apparatuses 21 connects one or more lower network apparatuses 20 to each other.

Herein, the higher network and the lower network are divided according to the higher network or the lower network in the layered structure of the network based on specific equipment configuring the network.

For example, in a tree-structural network, a network including a parent node or a higher node based on the specific node in the tree structure becomes the higher network and a network including a child node or a lower node based on the specific node becomes the lower network.

Such a layered structure of the network may be formed according to a physical connection relationship, or formed according to a role in the network structure. That is, the higher and lower networks may be divided according to the role between the network apparatuses. For example, when a plurality of first network apparatuses performing the same role are connected to a second network apparatus managing one first network apparatus, the first network apparatus is the lower network apparatus 30 based on the second network apparatus, and the second network apparatus may be the higher network apparatus 10 based on the first network apparatus. Further, a connection network between the second network apparatus and the first network apparatus based on the second network apparatus may be the lower network.

Accordingly, various kinds of network apparatuses other than the control center may become the higher network apparatus 10. On the other hand, an apparatus connected to the lower network of the monitoring target apparatus 20 in the network may become the lower network apparatus 30. Accordingly, various kinds of network apparatuses other than the terminal apparatus may become the lower network apparatus 30 based on the monitoring target apparatus 20.

FIG. 3 is a flowchart of a network monitoring method according to the present invention, and FIG. 4 is a reference diagram illustrating a method in which the network monitoring method detours a packet according to the present invention.

The network monitoring method according to the present invention may include a first packet detouring step (S100) and a second packet detouring step (S200), and further include an apparatus monitoring step (S300).

In the first packet detouring step (S100), with respect to a first packet transmitted to the monitoring target apparatus 20 from the higher network apparatus 10, a first server 100 connected to the network converts the first packet to a predetermined communication protocol. The first packet is transmitted to the lower network apparatus 30 by detouring a path on which the first packet is transmitted to the lower network apparatus 30 through the monitoring target apparatus 20 by using a separate first communication connection C1 distinguished from the network.

In the second packet detouring step (S200), with respect to a second packet transmitted to the monitoring target apparatus 20 from the lower network apparatus 30, a second server 400 connected to the network converts the second packet to the communication protocol. The second packet is transmitted to the higher network apparatus 10 by detouring a path on which the second packet is transmitted to the higher network apparatus 10 through the monitoring target apparatus 20 by using a separate second communication connection C2 distinguished from the network.

In the apparatus monitoring step (S300), a monitoring program monitors the monitoring target apparatus 20.

Herein, as described above, the higher network apparatus 10 may be the control center of the network, the lower network apparatus 30 may be the terminal connected to the network, and the monitoring target apparatus 20 may be the intermediate connection apparatus supporting connection between the control center and the terminal.

First, the first communication connection C1 and the second communication connection C2 will be described.

Herein, the first communication connection C1 is a communication connection between the first server 100 and a first client 200 connected to the network, and the second communication connection C2 is a communication connection between the second server 400 and a second client 300 connected to the network.

The first communication connection C1 and the second communication connection C2 are communication connection paths configured for detouring the network connection from the existing higher network apparatus 10 to the lower network apparatus 30 through the monitoring target apparatus 20.

To this end, in the network monitoring method according to the present invention, the first packet from the higher network apparatus 10 to the monitoring target apparatus 20 is detoured by using the first communication connection C1 so as not to pass the monitoring target apparatus 20 and transmitted to the lower network apparatus 30 by using the second communication connection C2 again. The first packet detouring step (S100) corresponds to the packet detouring.

In the same manner, in the network monitoring method according to the present invention, reversely, the second packet from the lower network apparatus 30 to the monitoring target apparatus 20 is detoured by using the second communication connection C2 so as not to pass the monitoring target apparatus 20 and transmitted to the higher network apparatus 10 by using the first communication connection C1 again. The second packet detouring step (S200) corresponds to the packet detouring.

To this end, the first communication connection C1 and the second communication connection C2 are connection networks configured separately from the existing network connection in which the higher network apparatus 10, the monitoring target apparatus 20, and the lower network apparatus 30 are connected to each other to communicate with each other.

The first communication connection C1 and the second communication connection C2 communicate with each other by using a predetermined communication protocol. Herein, the predetermined communication protocol may be a protocol distinguished from the protocol used in the network. For example, the communication protocol used in the first communication connection C1 and the second communication connection C2 may be a TCP/IP protocol. In this case, the communication protocol may use various kinds of protocols if necessary.

The network monitoring method according to the present invention may be applied to all networks using various protocols through a protocol conversion means which detours the path of the packet after converting the protocol of the existing network to the predetermined communication protocol such as TCP/IP, by using the predetermined communication protocol distinguished from the protocol used in the existing network.

Herein, the predetermined communication protocol may be the TCP/IP protocol. The reason is that a communication method which supports the communication between the first server and the first client and the communication between the second server and the second client most effectively in terms of cost is the TCP/IP communication protocol. However, as described above, the communication protocol used in the first communication connection C1 and the second communication connection C2 may be a short-range communication protocol including Bluetooth and NFC or various wired and wireless communication protocols other than the short-range communication protocol.

Hereinafter, in the first packet detouring step (S100), a method of detouring the first packet to be transmitted through the existing network to the lower network apparatus 30 from the original higher network apparatus 10 through the monitoring target apparatus 20 by using the first server 100, the first client 200, the second client 300, and the second server 400 will be described in more detail.

FIG. 5 is a flowchart illustrating a detailed operation of a first packet detouring step (S100).

In the first packet detouring step (S100), first, the first server 100 converts the first packet transmitted from the higher network apparatus 10 to the monitoring target apparatus 20 into the predetermined communication protocol (S101). For example, the first packet may be converted into a TCP/IP protocol.

Next, the first server 100 transmits the converted first packet to the first client 200 through the first communication connection C1 (S102). Herein, the first server 100 and the first client 200 may transmit the converted first packet by using the predetermined communication protocol. Therefore, when the first packet is converted into the TCP/IP protocol, the converted first packet may be transmitted through an Ethernet connection.

Next, the first client 200 inversely converts the converted first packet into the protocol used in the network to acquire the first packet (S103). That is, herein, the first packet converted into the predetermined communication protocol is inversely converted into the existing protocol again. For example, when the network uses a DNP3 protocol, the first packet converted into the TCP/IP protocol may be converted into the existing DNP3 protocol again.

Next, the first client 200 transmits the first packet to the second client 300 through the network (S104). As described above, the first client 200 and the second client 300 are connected to the network. Herein, the first client 200 and the second client 300 may be connected to the higher network apparatus 10 and connected to the intermediate connection apparatus 21 positioned on the same layer as the monitoring target apparatus 20. In addition, the first client 200 transmits the first packet to the second client 300 through the connected intermediate connection apparatus 21.

Herein, the case that the first client 200 and the second client 300 are positioned on the same layer as the monitoring target apparatus 20 means the case that the first client 200 and the second client 300 perform the same role as the connected terminal on a network layer. For example, when the monitoring target apparatus 20 is an RTU, the intermediate connection apparatus 21 may also be the RTU and when the monitoring target apparatus 20 is a predetermined type of repeater, the intermediate connection apparatus 21 may also be the same type of repeater. This is a concept apparent to those skilled in the art because an apparatus to be monitored is selected among the plurality of intermediate connection apparatuses 21 to be set as the monitoring target apparatus 20.

Next, the first packet received by the second client 300 is converted into the predetermined communication protocol (S105). Herein, the method in which the second client 300 converts the first packet may be the same as the method of converting the first packet in step S101.

Next, the second client 300 transmits the converted first packet to the second server 400 through the second communication connection C2 (S106). Herein, the second communication connection C2 may transmit the converted first packet by using the predetermined communication protocol between the second server 400 and the second client 300 similarly to the first communication connection C1.

Next, the second server 400 inversely converts the received converted first packet to acquire the first packet (S107). Herein, the second server 400 inversely converts the converted first packet to acquire the first packet which is not converted in the same method as step S103.

Next, the second server 400 transmits the first packet to the lower network apparatus 30 (S108). Herein, the second server 400 transmits the first packet to the lower network apparatus 30 through the network.

As described above, when the first packet is transmitted to the lower network apparatus 30, the lower network apparatus 30 performs an operation according to the received first packet and collects and generates data corresponding thereto and packetizes the collected and generated data again to generate the second packet and transmit the generated packet to the higher network apparatus 10.

Herein, the first packet or the second packet which designate a series of packets constituting the transmitted data are designated as first or second according to transmission directionality and will not fixedly designate only a predetermined specific packet.

For example, a series of first packets containing a command to read specific measurement data may be transmitted to the measurement terminal which is the lower network apparatus 30 from the control center which is the higher network apparatus 10 and the lower network apparatus 30 may transmit a series of second packets containing measurement data according to the above command to the higher network apparatus 10 as a response thereto. In the first packet detouring step (S100) and the second packet detouring step (S200) according to the present invention, a path is configured, in which the first packet or the second packet are detoured without passing through the monitoring target apparatus 20 on the existing network connection.

Meanwhile, in the first packet detouring step (S100), an identification number may be granted to the first packet acquired through the inverse conversion in step (S103) in which the first client 200 inversely converts the converted first packet into the protocol used in the network to acquire the first packet.

Herein, when the identification number is granted to the first packet, a specific number may be granted to any one of surplus fields of which values are changeable without influencing communication among data fields of the first packet depending on the protocol used in the network to grant the identification number. For example, when the protocol used in the network is the DNP3 protocol and the surplus field among the data fields of the first packet is a Destination Address field, the identification number as a predetermined number is written in the surplus field to grant the identification number to the first packet.

When the identification number is granted, the first client 200 may transmit the first packet to which the identification number is granted to the second client 300 in step S104.

When the identification number is granted to the packet as described above, it is advantageous that the corresponding packet is received and thereafter, the field of the packet is analyzed to verify that the corresponding packet is a packet detoured and transmitted unlike the existing network path.

Next, in more detail, described is a method for originally detouring the second packet to be transmitted from the lower network apparatus 30 to the higher network apparatus 10 via to the monitoring target apparatus 20 through the existing network by using the first server 100, the first client 200, the second client 300, and the second server 400 in the second packet detouring step (S200), in the similar method to the first packet detouring step (S100). However, since the second packet detouring step (S200) has a relationship that the second detouring step (S200) operates by the same method in a symmetric structure to the first packet detouring step (S100), a duplicated detailed description is omitted.

FIG. 6 is a flowchart illustrating a detailed operation of a second packet detouring step (S200).

In the second packet detouring step (S200), first, the second server 400 converts the second packet transmitted from the lower network apparatus 30 to the monitoring target apparatus 20 into the predetermined communication protocol (S201).

Next, the second server 400 transmits the converted second packet to the second client 300 through the second communication connection C2 (S202).

Next, the second client 300 inversely converts the converted second packet into the protocol used in the network to acquire the second packet (S203).

Next, the second client 300 transmits the second packet to the first client 200 through the network (S204).

Next, the first client 200 converts the received second packet into the predetermined communication protocol (S205).

Next, the first client 200 transmits the converted second packet to the first server 100 through the first communication connection C1 (S206).

Next, the first server 100 inversely converts the received converted second packet to acquire the second packet (S207).

Next, the first server 100 transmits the second packet to the higher network apparatus 10 (S208).

Through the first packet detouring step (S100) and the second packet detouring step (S200), while the packets mutually transmitted between the higher network apparatus 10 and the lower network apparatus 20 through the monitoring target apparatus 20 are continuously transmitted, the packets input in the monitoring target apparatus 20 are simultaneously blocked, and as a result, the monitoring target apparatus 20 may be in an idle state. Accordingly, the monitoring target apparatus 20 which is in the idle state through such a process may be monitored or updated and the existing operating network may continuously operate without stop even during monitoring.

Meanwhile, in the second packet detouring step (S200), the identification number may be granted to the second packet acquired through the inverse conversion in the step (S203) in which the second client 300 inversely converts the converted second packet into the protocol used in the network to acquire the second packet. Herein, the identification number may be granted to the second packet instead of the first packet by the same method as described in step S103.

When the identification number is granted, the second client 300 may transmit the second packet to which the identification number is granted to the first client 200 in step S204.

In the apparatus monitoring step (S300), the monitoring program monitors the monitoring target apparatus 20.

In the apparatus monitoring step (S300), the monitoring program inputs various types of predetermined data in the monitoring target apparatus 20 and verifies output data depending on the input data to determine whether the monitoring target apparatus 20 is abnormal.

Herein, the monitoring program that operates in the monitoring target apparatus 20 is not limited to a specific type and may adopt various types of software mode monitoring programs for monitoring network equipment.

For example, the monitoring program inputs various types of predetermined data in order to monitor security vulnerability of the monitoring target apparatus 20 and verifies the resulting output data or verifies an operating status of the monitoring target apparatus 20 to perform determining the security vulnerability of the monitoring target apparatus 20.

As one example of the monitoring program, a Fuzzing test program may be used. The Fuzzing test program inputs data depending on a predetermined Fuzzing case in the monitoring target apparatus 20 and verifies whether the monitoring target apparatus 20 outputs a response to the input data to determine that the security of the monitoring target apparatus 20 is vulnerable when the response is not output at a predetermined number of times or more.

In the apparatus monitoring step (S300), the monitoring program that monitors the monitoring target apparatus 20 may adopt various types of existing known test programs that test the network equipment in addition to the Fuzzing test program.

FIG. 7 is a block diagram illustrating a network monitoring system according to yet another exemplary embodiment of the present invention.

The network monitoring system according to the present invention may include a first server 100, a first client 200, a second client 300, and a second server 400. Herein, the network monitoring system may operate in the same manner as the operation of the first server 100, the first client 200, the second client 300, and the second server 400 in the aforementioned network monitoring method with reference to FIGS. 1 to 6. Accordingly, the duplicated part will be omitted or briefly described.

The first server 100 converts a first packet transmitted to the monitoring target apparatus 20 from the higher network apparatus 10 to a predetermined communication network.

The first client 200 receives the converted first packet from the first server 100 by using the first communication connection C1 distinguished from the network and reversely converts the first packet to the protocol used in the network to obtain the first packet.

The second client 300 receives the first packet from the first client 200 through the network and converts the received first packet to the predetermined protocol.

The second server 400 receives the converted first packet from the second client 300 by using the separate second communication connection C2 distinguished from the network and reversely convert the first packet to the protocol used in the network to obtain the first packet and transmits the first packet to the lower network apparatus 30.

Herein, the first communication connection is communication connection between the first server 100 and a first client 200 connected to the network, and the second communication connection is communication connection between the second server 400 and a second client 300 connected to the network.

The first client 200 and the second client 300 are connected to the higher network apparatus 10 and connected to the intermediate connection apparatus 21 positioned on the same layer as the monitoring target apparatus 20.

Next, a process of detouring and transmitting the second packet from the lower network apparatus 30 to the higher network apparatus 10 will be described.

The second server 400 converts the second packet transmitted from the lower network apparatus 30 to the monitoring target apparatus 20 to the predetermined communication protocol and transmits the converted second packet to the second client 300 through the second communication connection C2.

The second client 300 reversely converts the converted second packet to the protocol used in the network to obtain the second packet and transmits the obtained second packet to the first client 200 through the network.

The first client 200 converts the received second packet to the predetermined communication protocol to transmit the converted second packet to the first server 100.

The first server 100 reversely converts the transmitted converted second packet to obtain the second packet and transmits the obtained second packet to the higher network apparatus 10.

Herein, in the network monitoring system, the first packet is transmitted from the higher network apparatus 10 to the lower network apparatus 30 by detouring the path on which the first packet is transmitted to the lower network apparatus 30 through the monitoring target apparatus 20 by using the first communication connection C1. The second packet is transmitted from the lower network apparatus 30 to the higher network apparatus 10 by detouring the path on which the second packet is transmitted to the higher network apparatus 10 through the monitoring target apparatus 20 by using the second communication connection C2.

The first communication connection C1 and the second communication connection C2 communicate to each other by using the predetermined communication protocol, and in this case, the predetermined communication protocol may be a different protocol from the protocol used in the network.

Herein, in the monitoring target apparatus 20, the monitoring program may input various types of data predetermined in the monitoring target apparatus 20 and verify output data according to the input data to determine an error of the monitoring target apparatus 20.

Herein, the first client 200 may grant an identification number to the first packet and transmit the first packet granted with the identification number to the second client 300. The second client 300 may grant an identification number to the second packet and transmit the second packet granted with the identification number to the first client 200.

Even though all components of the exemplary embodiment of the present invention described above may be combined as one component or operate through a combination, the present invention is not particularly limited to the exemplary embodiment. In other words, one or more components among all components may be selectively combined to be operated within a scope of the present invention.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for monitoring a network, the method comprising:

a first packet detouring process of, with respect to a first packet transmitted to a monitoring target apparatus from a higher network apparatus, converting, by a first server, the first packet transmitted from the higher network apparatus to the monitoring target apparatus into a predetermined communication protocol and transmitting the converted first packet to a first client through a first communication connection, the first communication connection being a communication connection between the first server and the first client connected to the network, inversely converting, by the first client, the converted first packet into the protocol used in the network to acquire the first packet and transmitting the acquired first packet to a second client through the network, converting, by the second client, the received first packet into the predetermined communication protocol and transmitting the converted first packet to a second server through a second communication connection, and inversely converting, by the second server, the received converted first packet to acquire the first packet and transmitting the acquired first packet to a lower network apparatus; and a second packet detouring process of, with respect to a second packet transmitted to the monitoring target apparatus from the lower network apparatus, converting, by the second server connected to the network, the second packet to the predetermined communication protocol and transmitting the converted second packet to the higher network apparatus by detouring a path on which the second packet is transmitted to the higher network apparatus through the monitoring target apparatus by using the second communication connection distinguished from the network.

2. The method of claim 1, further comprising:
an apparatus monitoring process in which a monitoring program monitors the monitoring target apparatus.

3. The method of claim 2, wherein in the apparatus monitoring process, a monitoring program inputs various types of predetermined data in the monitoring target apparatus and verifies output data depending on the input data to determine whether the monitoring target apparatus is abnormal.

4. The method of claim 1, wherein in the first communication connection and the second communication connection, communication is performed by using the predetermined communication protocol, and
the predetermined communication protocol is a protocol different from the protocol used in the network.

5. The method of claim 1, wherein the second communication connection is a communication connection between the second server and the second client connected to the network, and
the first client and the second client are connected to the higher network apparatus and connected to an intermediate connection apparatus positioned on the same layer as the monitoring target apparatus.

6. The method of claim 5, wherein the second packet detouring process includes
converting, by the second server, the second packet transmitted from the lower network apparatus to the monitoring target apparatus into the predetermined communication protocol and transmitting the converted second packet to the second client through the second communication connection,
inversely converting, by the second client, the converted second packet into the protocol used in the network to acquire the second packet and transmitting the acquired second packet to the first client through the network,
converting, by the first client, the received second packet into the predetermined communication protocol and transmitting the converted second packet to the first server through the first communication connection, and
inversely converting, by the first server, the received converted second packet to acquire the second packet and transmitting the acquired second packet to the higher network apparatus.

7. The method of claim 6, wherein in the acquiring of the second packet and transmitting of the acquired second packet to the first client through the network, the identification number is granted to the second packet and the second packet to which the identification number is granted is transmitted to the first client.

8. The method of claim 7, wherein as the identification number, a specific number is granted to any one of surplus fields of which values are changeable without influencing communication among data fields of the packet depending on the protocol used in the network to grant the identification number.

9. The method of claim 1, wherein the predetermined communication protocol is a TCP/IP protocol.

10. The method of claim 1, wherein in the acquiring of the first packet and transmitting of the acquired first packet to the second client through the network, an identification number is granted to the first packet and the first packet to which the identification number is granted is transmitted to the second client.

11. The method of claim 10, wherein as the identification number, a specific number is granted to any one of surplus fields of which values are changeable without influencing communication among data fields of the packet depending on the protocol used in the network to grant the identification number.

12. The method of claim 1, wherein the higher network apparatus is a control center of the network,
the lower network apparatus is a terminal connected to the network, and
the monitoring target apparatus is an intermediate connection apparatus that supports a connection of the control center and the terminal.

13. A system for monitoring a network, the system comprising:
a first server converting a first packet transmitted from a higher network apparatus to a monitoring target apparatus into a predetermined communication protocol;
a first client receiving the converted first packet from the first server by using a separate first communication connection distinguished from the network and inversely converting the received first packet into the protocol used in the network to acquire the first packet;
a second client receiving the first packet from the first client through the network and converting the received first packet into the predetermined protocol; and
a second server receiving the converted first packet from the second client by using a separate second communication connection distinguished from the network and inversely converting the received first packet into the protocol used in the network to acquire the first packet and transmitting the first packet to a lower network apparatus.

14. The system of claim 13, wherein the first communication connection is a communication connection between the first server and a first client connected to the network,
the second communication connection is a communication connection between the second server and a second client connected to the network, and
the first client and the second client are connected to the higher network apparatus and connected to an intermediate connection apparatus positioned on the same layer as the monitoring target apparatus.

15. The system of claim 14, wherein the second server converts a second packet transmitted from the lower network apparatus to the monitoring target apparatus into the predetermined communication protocol and transmits the converted second packet to the second client through the second communication connection,
the second client inversely converts the converted second packet into the protocol used in the network to acquire the second packet and transmits the acquired second packet to the first client through the network,
the first client converts the received second packet into the predetermined communication protocol and transmits the converted second packet to the first server, and
the first server inversely converts the received converted second packet to acquire the second packet and transmits the acquired second packet to the higher network apparatus.

16. The system of claim 15, wherein the network monitoring system transmits the first packet from the higher network apparatus to the lower network apparatus by detouring a path on which the first packet is transmitted to the lower network apparatus through the monitoring target apparatus by using the first communication connection and transmits the second packet from the lower network apparatus to the higher network apparatus by detouring a path on which the second packet is transmitted to the higher network apparatus through the monitoring target apparatus by using the second communication connection, in the first communication connection and the second communication connection, communication is performed by using the predetermined communication protocol, and the predetermined communication protocol is a protocol different from the protocol used in the network.

17. The system of claim 13, wherein in the monitoring target apparatus, a monitoring program inputs various types of predetermined data in the monitoring target apparatus and verifies output data depending on the input data to determine whether the monitoring target apparatus is abnormal.

* * * * *